Aug. 11, 1964     L. R. ROBINSON     3,144,319
TREATING GLASS SHEETS
Filed March 27, 1961
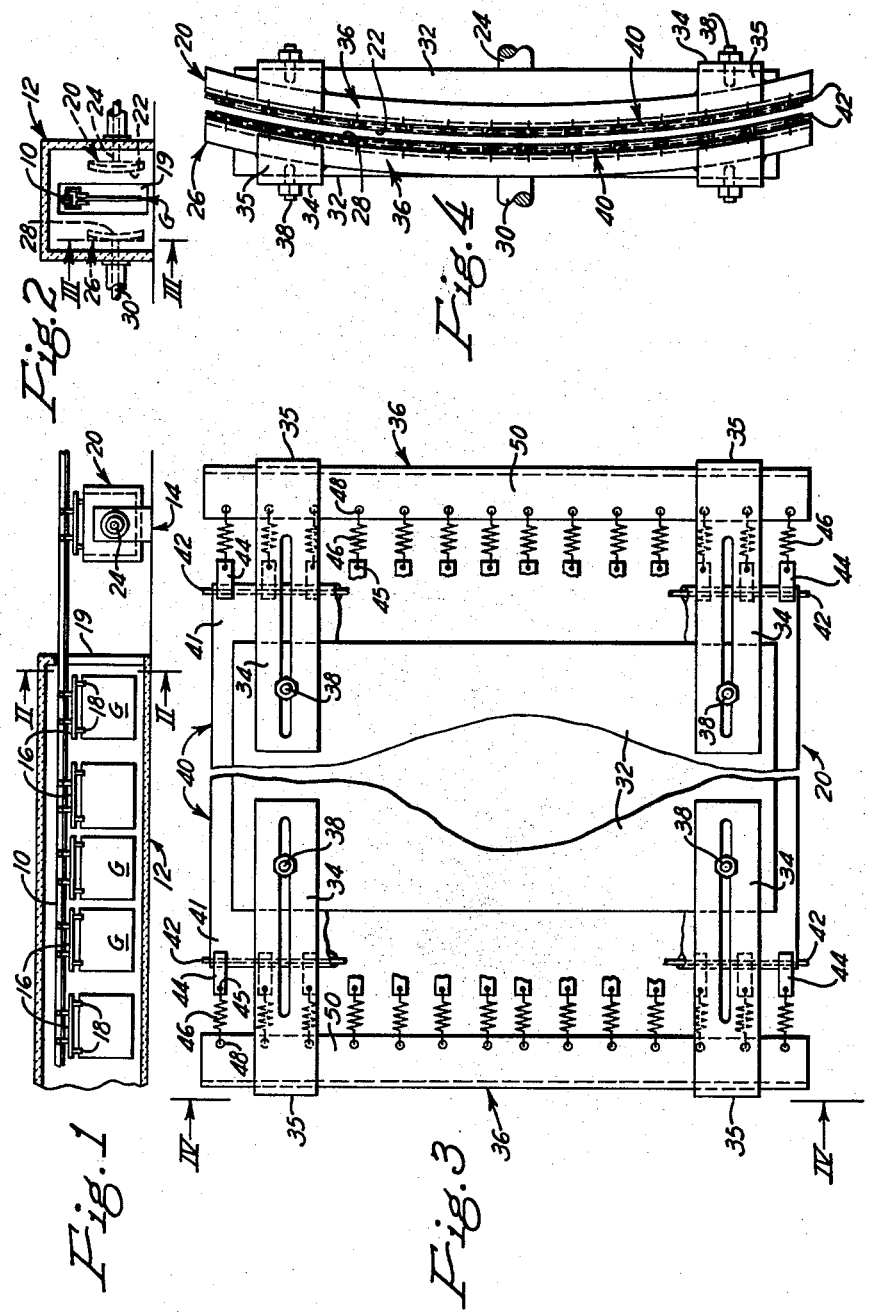
INVENTOR.
LEE R. ROBINSON
BY Oscar Spencer
ATTORNEY United States Patent Office 3,144,319
Patented Aug. 11, 1964

3,144,319
TREATING GLASS SHEETS
Lee R. Robinson, Tarentum, Pa., assignor to Pittsburgh Plate Glass Company, Pittsburgh, Pa., a corporation of Pennsylvania
Filed Mar. 27, 1961, Ser. No. 98,667
10 Claims. (Cl. 65—106)

The present invention relates to treating glass sheets, and specifically refers to improved covers for the complementary shaping surfaces of press bending apparatus.

It is well known to bend glass sheets by supporting them in a given plane, heating them to substantially their softening point, and shaping each heat-softened glass sheet by providing relative motion between a pair of pressing members having opposed complementary shaping surfaces to cause them to sandwich the heat-softened glass sheet therebetween. The pressure imposed on the glass shapes the heat-softened glass sheet into conformity with the shaping surfaces of the pressing members. It is also well known to employ a cover member of flexible material that does not mar glass nor is affected by exposure to the temperature of the heat-softened glass sheet on contact therewith as a parting material between the heat-softened glass sheet and the shaping surface of the pressing member to protect either the pressing member or the optical properties of the glass sheet or both.

Prior to the present invention it was well recognized that the material which serves as a cover for the shaping surfaces of the pressing members must be tensioned in order to prevent wrinkling of the fabric of the parting material. The necessity for avoiding wrinkling is to avoid imposing the wrinkles of the parting material in the heat-softened surfaces of the glass sheet undergoing bending by pressing. In British Patent No. 699,068, provision is made for interposing sheets of fiber glass mounted in tension on flexible metal frames between the glass surfaces and the shaping members. In British Patent No. 773,733, a cover of glass cloth is supported in tension by spaced, spring actuated rollers against the opposite surface of the heat-softened glass sheet from the one engaged by a convex pressing member when the pressing member is brought into pressurized engagement with the glass sheet in order to shape the latter.

The techniques employed prior to the present invention for tensioning the covers for the pressing members did not avoid wrinkling of the cover members completely. Furthermore, the life of the glass cloth covers was exceptionally short because the glass cloth wore out very quickly, particularly in the regions where the covers first contacted the pressing member shaping surfaces. The present invention arose as a result of the observation that the prior techniques were susceptible of poor durability of the covers and wrinkling of the covers because the prior art techniques were incapable of providing a uniform tension throughout the extent of each cover interposed between each pressing member and the adjacent surface of the heat-softened glass sheet as the pressing members increase their area of pressurized contact with the opposite surfaces of the glass sheet. It remained for the present invention to determine that the main reason why the prior art devices were not completely successful is that the prior art devices do not shape the cover members to their ultimate shape while maintaining the latter in tension. It remained for the present invention to correlate wrinkling and short life of the cover members with their distortion in shape that resulted from sandwiching the cover members between a flat deformable glass sheet and a curved shaping member. Applicant reasoned that distortion and its consequence, wrinkling, would be reduced if the cover member were initially stretched to its ultimate shape to avoid distortion and wrinkling on being sandwiched between a formable sheet and a solid pressing member.

The present invention provides novel apparatus for maintaining press member covers in uniform tension and in contact with the shaping surfaces of the pressing members throughout the bending cycle as the opposed complementary shaping surfaces of the pressing members increase their areas of contact with the glass. According to a specific embodiment of the present invention, each cover member is larger in area than its covered pressing member and is maintained in tension between a pair of tensioning members whose shape conforms to that of the shaping surface covered by the tensioned cover member.

The tensioning members flank the shaping surface of one or the other pressing member and are attached to the opposite end portions of the pressing member located between said pair of tensioning members. Means are provided for moving each tensioning member toward and away from the other tensioning member of its pair only in a direction parallel to the axis of curvature of the pressing member located between said pair. Tensioning means interconnects each tensioning member with an adjacent end portion of the cover member extending beyond an edge of the shaping surface of the pressing member against which it is held in continuous contact.

The novel construction of the present invention provides proper shaping and uniform tensioning of the cover member along its entire length and throughout its curved dimension. This construction insures that the uniform tensioning applied to the cover member when the pressing members are separated from each other and out of contact with a glass sheet is not disturbed as the covers contacting the pressing members make contact with increasing areas of the opposite surfaces of the glass sheet during the pressing operation that shapes the glass.

When cover members tensioned in a flat plane as in the prior art are sandwiched between the surfaces of the heat-softened glass sheet and the complementary curved shaping surfaces of the pressing members, the tensioning of the cover members is changed locally as each increment of the cover contacts the glass sheet. This local variation in tensioning stress causes the cover members to wrinkle during use. The wrinkles imparted to the cover members as they are distorted from a flat to a curved configuration impose a wrinkle pattern on the surfaces of the heat-softened glass sheet.

By tensioning the cover members in a direction parallel to the axis of bending between tensioning members having a shape identical to that of the shaping face of the pressing member they flank and by applying the tension through a large number of closely spaced grippers that interconnect the end portions of the cover members to the tensioning members, the cover members are stretched in uniform tension while being shaped in a curved configuration conforming to the ultimate configuration of the bent glass. Therefore, the cover members of the present invention are not distorted when the pressing members of apparatus conforming to the present invention are brought into pressurized contact with the formable glass sheet with the cover members interposed therebetween. It is this freedom from distortion of the cover members on contacting the glass that provides the freedom from wrinkling inherent in the present invention, an improved operation compared to that of the prior art.

A typical embodiment of the present invention will now be described and illustrated in order to disclose the best mode of performing the present invention.

In the drawings which form part of the disclosure in this application and wherein like reference numerals are applied to like structural elements, FIG. 1 is a fragmentary longitudinal view of a furnace and a pressing station constructed according to a preferred embodiment of the present invention.

FIG. 2 is a sectional view along the lines II—II of FIG. 1.

FIG. 3 is a fragmentary end elevation of a rear face of one of the pressing members with various elements removed in order to enlarge the scale to maximum possible size, and is taken along the lines III—III of FIG. 2.

FIG. 4 is an end view of the apparatus seen along the lines IV—IV of FIG. 3.

Referring to the drawings, reference number 10 refers to a carriage conveyor that extends along a horizontal path through a tunnel-like furnace 12 and a press bending station 14. A plurality of carriages 16 are conveyed along the carriage conveyor 10. Each carriage 16 is provided with a pair of tongs 18 which serve as means for supporting a glass sheet G in a given plane, which usually is a vertical plane that intersects the path of conveyor 10.

Referring to FIG. 2, the furnace 12 is seen in the foreground looking through the exit 19. It is possible to see in phantom the glass forming apparatus at the press bending station 14. This comprises a convex pressing member 20 having a convex shaping surface 22. An actuating piston 24 is connected to the convex pressing member to move the latter in a direction at an angle to the path traversed by the glass sheet G passing through the bending station 14.

At the opposite side of the vertical plane intersecting the carriage conveyor 10, there is a concave pressing member 26 having a concave shaping surface 28 the complement of the convex shaping surface 22 of the convex pressing member 20. An actuating piston 30 is attached to move the concave pressing member 26 in a direction opposite the movement imparted by the actuating piston 24 to the convex pressing member 20. The means for synchronizing the equal and opposing movements of pistons 24 and 30 is not shown because such construction is well known and does not form part of the present invention. Usually the pistons 24 and 30 actuate the pressing members toward and away from one another in horizontal paths whose axes are normal to the vertical plane of support for the glass sheet G.

The rear surface 32 of each of the pressing members 20 and 26 is flat. Slotted plates 34 are provided with legs 35 at their outer longitudinal extremities. The legs are attached to curved angle irons 36 by welding, for example. A set screw 38 extends through the slot of each slotted plate 34 and is screw-threadedly received in a threaded recess extending inwardly of a rear surface 32 to provide means adjustably connecting the slotted plates 34 to the pressing members 20 or 26.

A flexible cover sheet 40 of fiber glass or asbestos or any other fabric material capable of withstanding contact with heat-softened glass and having the characteristic of not marring the surface of the glass sheet is located in contact with convex shaping surface 22 of convex pressing member 20 and an additional sheet 40 is located in contact with the concave shaping surface 28 of the concave pressing member 26. Each cover sheet 40 has an area greater than that of the shaping surface against which it is in contacting relationship and is so positioned relative to its adjacent shaping surface as to extend beyond each edge of the latter to form an extending portion 41.

Each extending portion 41 is reinforced by a vertically extending flexible metal rod 42 of thin stainless steel (for example, 304 stainless steel having a diameter of about 3/16 inch) extending generally vertically along the extending portions 41 of the cover sheet 40 in a generally longitudinally curved path corresponding to the curvature of the shaping surface of its adjacent pressing member. A series of closely spaced grippers 44 such as wedge clamps are attached at their inner extremity along the length of each vertically extending flexible metal rod 42 with the outer extremity portion of the cover sheet 40 gripped between the inner extremity of the grippers 44 and each flexible metal rod 42. Each gripper 44 extends outwardly and is apertured at 45 near its outer extremity to receive one end of a spring 46. The outer end of each spring is received in an aperture 48 of a series of apertures drilled in a flange 50 of curved angle iron 36 that extends substantially parallel to the shaping surface of the adjacent shaping member.

The series of apertures are spaced from one another about one inch center to center and are located along a curved surface that is parallel to the shaping surface of the adjacent pressing member, but recessed therefrom so as to insure that the cover member is maintained in tension away from the plane traversed by the glass sheet. This reduces any possibility of wrinkling the cover member. Also, the curved angle irons 36, which serve as tensioning members, should be completely recessed relative to the shaping surfaces they flank to insure clearance for glass movement; stated another way, each tensioning member has a shaped surface of the same curved configuration as the curved shaping surface of the solid pressing member which it flanks. The shaped surface of the tensioning member is located facing said given plane of the means for supporting said glass sheet, and is spaced at least as great a distance from said given plane as is the curved surface of the pressing member which it flanks. Preferably, the tensioning member is spaced a greater distance from said given plane than the shaping surface it flanks.

An additional series of grippers 44 is attached to the other curved angle iron 36 flanking the other extremity of the pressing member 20 or 26 in a similar manner. Therefore, the relative distance of the curved angle irons 36 measured outwardly from a pressing member 20 or 26 determines the tension that is applied through the springs 46, grippers 44, and flexible metal rod 42, to the cover sheet 40 in contact with the shaping surface of each pressing member.

The apertures 48 of one tensioning member 36 are aligned with the apertures 48 of the other tensioning member 36 of the pair of tensioning members flanking each pressing member 20 or 26. This insures that the tension is applied in a direction parallel to the axis of curvature of the shaping surface of the pressing member whose shaping surface is covered by the cover member.

The flexibility of the metal rods 42 facilitates their conformance with the shape of the angle irons 36. Since the surfaces of angle irons 36 have a shape of the same curved configuration as the pressing member they flank, that is, they are shaped to conform exactly to the shape of the shaping surface of the pressing members 20 or 26, it follows that the shape of each cover sheet 40 conforms exactly to the shape of the shaping surfaces 22 or 28 of the pressing members 20 or 26, respectively, when the curved angle irons 36 are moved outwardly from the pressing members 20 or 26 to place the cover sheets 40 in tension. Stated another way, the curved shaping surfaces have opposite edges, on said surfaces, the edges being spaced with relation to one another in a direction parallel to an axis of curvature of said shaping surface. The large number of closely spaced connections between the ends 41 of the cover sheets 40 and the shaped angle irons or tensioning means 36 and the horizontal disposition of the slots of the slotted plates 34 insures that the tension applied to the cover members is substantially uniform. This uniform tensioning of the cover sheets 40 resulting from the outward displacement of the tensioning members 36 enables the cover sheets 40 to make intimate contact with the entire extent of the shaping surfaces regardless of whether the pressing members are in contact or out of contact with a glass sheet. When the cover is composed of fiber glass or asbestos or the like, it provides insulation preventing direct exposure of the glass sheets to the shaping surfaces of the pressing members 20 and 26. As stated previously, uniform tensioning in the manner accomplished by the present invention prevents wrinkling of the cover member which prevents distortion of the optical properties of the bent glass. In addition, since each cover member is maintained in contact with the shaping surface of the pressing member it covers, it is not distorted or subjected to the localized high tension stresses on contacting the formable glass sheet that caused the prior art devices described above to have a short life. Instead, the uniform overall tension is not increased locally at the regions of contact with the heat-softened glass using the present invention because the cover members are not distorted in shape on contacting the glass.

The above description of an illustrative embodiment of means to provide uniform tension for cover members along the axis of bending throughout the entire extent of the cover members is for the purpose of illustration rather than limitation. Many other mechanical equivalents are intended to be included in the claimed subject matter which follows.

For example, the illustrative embodiment shows apparatus for bending glass sheets about curvatures having a horizontal axis and the shaped tensioning members extend generally vertically. It is equally within the purview of the present invention to bend glass sheets about vertical axes and have the tensioning members flank the upper and lower edges of the pressing members and extend in horizontally curvilinear directions. Equally possible are oblique arrangements of the axes of curvature and tensioning members.

Other possible variations within the scope of the present invention involve press forming apparatus comprising a solid pressing member and a peripheral shaping member employing a fabric cover member for the solid pressing member only wherein tensioning members are employed to stretch form the cover member to the shape of the solid pressing member.

It is also considered within the scope of my invention to employ more than one layer of fabric as a covering for one or both shaping surfaces of complementary pressing members. In such cases the end portion of each individual layer of fabric is wrapped individually about a flexible rod different from that about which the end portion of the other layer is wrapped. In such a case the flexible rods are located in different vertical planes but are secured to the shaped tensioning members 36 through alternate connecting means 44, 46, which connect the layers alternately to the length of the tensioning end shaping member 36.

The above variations are merely exemplary of the many mechanical equivalents of the illustrative embodiments which become obvious in the light of the present invention.

What is claimed is:

1. In apparatus for bending glass sheets comprising means for supporting a heat-softened glass sheet in a given plane, a pair of solid pressing members having complementary curved shaping surfaces located on opposite sides of said plane, a cover member of a flexible material that does not mar glass nor is affected by exposure to the temperature of a heat-softened glass sheet on contact therewith on each of said complementary shaping surfaces, each of said curved shaping surfaces having an axis of curvature, each of said curved shaping surfaces having opposite edges on said surfaces, said edges being spaced with relation to one another on each shaping surface in a direction parallel to said axis of curvature, and means attached to at least one of said pressing members to provide relative movement between said pressing members in a direction angularly disposed relative to said plane to cause said pressing members to apply pressure against the opposite surfaces of a heat-softened glass sheet supported in said given plane, the improvement comprising a pair of tensioning members flanking each pressing member, one of said tensioning members being adjacent each of said opposite edges of each shaping surface, each said tensioning member having a shaped surface conforming to that of said edge of the curved shaping surface of the solid pressing member which it flanks, means attached to each said tensioning member and to its associated pressing member to adjust the position of the tensioning member relative to an adjacent edge of the curved surface of the pressing member to which it is attached in a direction parallel to said axis of curvature of said shaping surface, said shaped surface of the tensioning member being located facing said given plane of the means for supporting said glass sheet, the shaped surface of the tensioning member being at least as great a distance from said given plane as said edge of the curved surface of the solid pressing member which it flanks, each of said cover members having an end portion extending beyond each of the opposite edges of said shaping surfaces, and means attaching each said end portion to an adjacent tensioning member to shape said cover members to conform to said shaping surface on which it is located and to maintain said cover member in tension between said pair of tensioning members and in contact with said shaping surface.

2. The improvement as in claim 1, wherein each tensioning member is spaced a greater distance from said given plane than said edge of the shaping surface it flanks.

3. The improvement as in claim 1, wherein a plurality of connecting means interconnect each end portion of each said cover member to said adjacent tensioning member.

4. The improvement as in claim 3, wherein each of said plurality of connecting means interconnecting one end portion of said cover member to its adjacent tensioning member is arranged in alignment with a connecting means interconnecting the other end portion of said cover member to the other tensioning member of said pair of tensioning members along a line substantially parallel to said axis of curvature of said shaping surface.

5. In the art of shaping glass sheets by pressure forming heat-softened glass sheets between solid forming members having curved complementary shaping surfaces conforming to the curvature desired for the shaped glass sheets wherein a cover member of a flexible material that does not mar glass nor is affected by exposure to a heat-softened glass sheet on contact therewith is interposed between each surface of a glass sheet and a forming member, the improvement comprising applying uniform tension to each said cover member along a direction parallel to the axis of curvature of said complementary shaping surfaces of said solid forming members, shaping said cover members about said axis of curvature while under tension to conform to said complementary shaping surfaces, pressure forming said heat-softened glass between said covered forming members, and maintaining said cover members while so shaped and under tension in continuous contact with said shaping surfaces and interposed between said shaping surfaces and the surfaces of said heat-softened glass sheet throughout said pressure forming operation.

6. In the art of shaping glass sheets about a single axis of curvature only by pressure forming heat-softened glass sheets between solid forming members having complementary shaping surfaces conforming to the curvature desired for the shaped glass sheets wherein a cover member of a flexible material that does not mar glass nor is affected by exposure to a heat-softened glass sheet on contact therewith is interposed between each forming member and a surface of the heat-softened glass sheet, the improvement comprising applying uniform tension to said cover members along a direction parallel to the axis of curvature of the curved shaping surfaces of said solid forming members, shaping said cover members about said axis of curvature while under tension to conform to the shaping surfaces of said forming members, pressure forming said heat-softened glass between said covered forming members, and maintaining said cover members while so shaped and under tension in continuous contact with said shaping surfaces of said forming members and interposed between said shaping surfaces of said forming members and said surfaces of said heat-softened glass sheet throughout said pressure forming operation.

7. In apparatus for bending glass sheets comprising means for supporting a heat-softened glass sheet in a given plane, a pair of solid pressing members having complementary curved shaping surfaces located on opposite sides of said plane, a cover member of flexible material that does not mar glass nor is affected by exposure to the temperature of a heat-softened glass sheet on contact therewith on one of said shaping surfaces, said one curved shaping surface having an axis of curvature, said one curved shaping surface having opposite edges on said surface, said edges being spaced with relation to one another in a direction parallel to said axis of curvature, and means attached to at least one of said pressing members to provide relative movement between said pressing members in a direction angularly disposed relative to said plane to cause said pressing members to apply pressure against the opposite surfaces of a heat-softened glass sheet supported in said plane, the improvement comprising a pair of tensioning members flanking said solid pressing member which has a cover member, one of said tensioning members being adjacent each of said opposite edges of said covered shaping surface, each said tensioning member having a shaped surface conforming to that of said edge of the curved shaping surface of the solid pressing member which it flanks, means attached to each tensioning member and to said pressing member to adjust the position of the tensioning member relative to an adjacent edge of said curved surface of said pressing member in a direction parallel to said axis of curvature of said shaping surface, said shaped surface of the tensioning member being located facing said given plane of the means for supporting said glass sheet, the shaped surface of the tensioning member being at least as great a distance from said given plane as the edge of the curved surface of the pressing member which it flanks, said cover member having an end portion extending beyond each of the opposite edges of said shaping surface, and means attaching each said end portion to an adjacent tensioning member to shape said cover member to conform to said shaping surface, and to maintain said cover member in tension between said pair of tensioning members in contact with said shaping surface.

8. The improvement as in claim 7, wherein each tensioning member is spaced a greater distance from said given plane than said edge of the shaping surface it flanks.

9. The improvement as in claim 7, wherein a plurality of connecting means interconnect each end portion of said cover member to said adjacent tensioning member.

10. The improvement as in claim 9, wherein each of said plurality of connecting means interconnecting one end portion of said cover member to its adjacent tensioning member is arranged in alignment with a connecting means interconnecting the other end portion of said cover member to the other tensioning member of said pair of tensioning members along a line substantially parallel to said axis of curvature of said shaping surface.

References Cited in the file of this patent

UNITED STATES PATENTS

| | | |
|---|---|---|
| 305,707 | Norwood | Sept. 23, 1884 |
| 1,889,881 | Thompson | Dec. 6, 1932 |
| 2,251,159 | Owen | July 29, 1941 |
| 2,655,196 | Magnani | Oct. 13, 1953 |
| 2,850,844 | White | Sept. 9, 1958 |
| 3,077,753 | Dammers | Feb. 19, 1963 |

FOREIGN PATENTS

| | | |
|---|---|---|
| 845,786 | France | May 22, 1939 |
| 773,733 | Great Britain | May 1, 1957 |
| 1,215,559 | France | Nov. 23, 1959 |